United States Patent [19]

Kimura et al.

[11] 4,201,849
[45] May 6, 1980

[54] ACETAL RESIN COMPOSITION

[75] Inventors: Masaharu Kimura, Tokyo; Yoshiharu Otuki, Urawa; Akitoshi Sugio, Ohmiya; Tomotaka Furusawa, Matsudo, all of Japan

[73] Assignee: Mitsubishi Gas Chemical Company, Inc., Tokyo, Japan

[21] Appl. No.: 964,445

[22] Filed: Nov. 28, 1978

Related U.S. Application Data

[63] Continuation-in-part of Ser. No. 891,121, Mar. 28, 1978, abandoned.

[30] Foreign Application Priority Data

Apr. 1, 1977 [JP] Japan .................................. 52-36207

[51] Int. Cl.$^2$ .............................................. C08G 63/68
[52] U.S. Cl. .................................. 525/401; 525/403; 525/410; 528/290; 525/398; 525/509
[58] Field of Search ........... 260/829, 874, 887, 897 R; 528/290, 231

[56] References Cited

U.S. PATENT DOCUMENTS 3,795,715  3/1974  Cherdron et al. ................... 260/823

FOREIGN PATENT DOCUMENTS 47-8815  7/1962  Japan .
47-8816  7/1962  Japan .

Primary Examiner—Melvyn I. Marquis
Attorney, Agent, or Firm—Wenderoth, Lind & Ponack

[57] ABSTRACT

An acetal resin composition comprising an admixture of 100 parts by weight of an acetal resin and 0.01 to 15 parts by weight of a petroleum resin, said petroleum resin being prepared by polymerizing a cracked petroleum fraction boiling between −15° C. and 200° C. and containing unsaturated hydrocarbons, and having a molecular weight in the range of 400 to 2500 and a second order transition temperature in the range of 35° to 90° C.

5 Claims, No Drawings

ACETAL RESIN COMPOSITION

This is a continuation-in-part application of Ser. No. 891,121, filed Mar. 28, 1978 and now abandoned.

FIELD OF THE INVENTION

The present invention is related to acetal resin compositions which exhibit very small mold shrinkage and mold deformation surface (warping) that would develop during the operation of injection molding, without at all losing mechanical properties, thermal properties, moldability and thermal stability.

BACKGROUND OF THE INVENTION

Owing to their well-balanced mechanical properties, excellent resistance against wear and excellent resistance against the heat, the acetal resins have extensively been used in such fields as automotive industries, electric machinery, building materials and the like.

However, the acetal resins have high degree of crystallinity and exhibit considerably higher mold shrinkage than general amorphous resins at the time when being molded by an injection-molding machine. Further, due to their anisotropic properties, the flowing acetal resins tend to develop deformation on the finally molded articles. Particularly, when the molded articles are flat boards, the deformation appears as warping.

To improve the abovementioned defects, various methods have been proposed, for example, a method to decrease the molecular weight of the acetal resins, or methods disclosed in Japanese Patent Publication No. 8816/62 and Japanese Patent Publication No. 8815/62 which are to decrease the melt viscosity by adding a polyalkylene glycol or an aliphatic alcohol to the acetal resins.

With the former method, however, the reduction in molecular weight causes the resins to lose the mechanical strength as well as other properties whereby the acetal resins lose their inherent merits. With the latter methods, on the other hand, the thermal stability of the acetal resins is markedly reduced deteriorating, at the same time, the mechanical strength.

The inventors of the present invention have found through their keen research that a composition which exhibits very small mold shrinkage and very small mold deformation (surface warping) at the time of molding operation, is obtained if a petroleum resin prepared by polymerizing a cracked petroleum fraction boiling between $-15°$ and $200°$ C. and containing unsaturated hydrocarbons, and having a molecular weight in the range of 400 to 2500 and a second order transition temperature in the range of $35°$ to $90°$ C. is added to the acetal resin.

Astonishingly, the addition of the abovesaid petroleum resin to the acetal resin does not at all deteriorate various properties of the acetal resins such as thermal stability, moldability and thermal properties, but rather helps increase the mechanical properties.

The acetal resins themselves and the petroleum resins themselves are widely known compounds. However, it was not so far known that a resin composition obtained by blending these two resins exhibit the aforementioned excellent properties.

SUMMARY OF THE INVENTION

According to the present invention, there is provided an acetal resin composition comprising an admixture of 100 parts by weight of an acetal resin and 0.01 to 15 parts by weight of a petroleum resin, said petroleum resin being prepared by polymerizing a cracked petroleum fraction boiling between $-15°$ and $200°$ C. and containing unsaturated hydrocarbons, and having a molecular weight in the range of 400 to 2500 and a second order transition temperature in the range of $35°$ to $90°$ C.

DETAILED DESCRIPTION OF THE INVENTION

A petroleum resin is, as is well known, a synthetic resin obtained by the polymerization reaction of hydrocarbon mixture oil containing unsaturated hydrocarbons produced, as by-products, at the time of cracking or reforming the petroleum.

In the present invention, the petroleum resin used as an additive to improve the mold shrinkage and mold deformation of an acetal resin has a molecular weight ranging from 400 to 2500 and a second order transition temperature in the range of $35°$ to $90°$ C. The resin composition of the present invention contains the petroleum resin in an amount of 0.01 to 15 parts by weight, preferably in an amount of 0.02 to 10 parts by weight per 100 parts by weight of the acetal resin. When the molecular weight of the petroleum resin used is outside the range of 400 to 2500, the surface of the shaped article made from the composition is somewhat colored undesirably (turns yellow). Moreover, when the second order transition temperature of the petroleum resin used is outside the range of $35°$ to $90°$ C., it is extremely difficult to improve the mold shrinkage and mold deformation without impairing various properties, above all mechanical properties of the composition.

If the amount of the petroleum resin is less than 0.01 part by weight, the resulting composition presents practically insufficient effects, and if the amount is greater than 15 parts by weight, the properties of the acetal resins are impaired.

Generally speaking, petroleum resins can be classified into aliphatic petroleum resin, aromatic petroleum resin and alicyclic petroleum resin depending upon the hydrocarbon mixture oil used as a principal starting material for producing the subject resin. According to the present invention, the resin composition may consist of any one or two or more of these three petroleum resins.

The aliphatic petroleum resin used in the present invention is obtained by polymerizing a hydrocarbon mixture oil boiling between $-15°$ and $50°$ C. and principally composed of a fraction of an aliphatic hydrocarbon having 4 or 5 carbon atoms. Examples of the aliphatic hydrocarbons having 4 carbon atoms may include n-butane, isobutane, 1-butene, isobutene, cis-2-butene, trans-2-butene, 1,3-butadiene and the like. Examples of the hydrocarbons having 5 carbon atoms may include n-pentane, isopentane, 1-pentene, 2-methyl-1-butene, 3-methyl-1-butene, cis-2-pentene, trans-2-pentene, 2-methyl-1,3-butadiene, 1-cis-3-pentadiene, 1-trans-3-pentadiene, cyclopentadiene and the like.

The aromatic petroleum resin used in the present invention is obtained by polymerizing a hydrocarbon mixture oil boiling $100°$ C. and $200°$ C. and principally composed of a fraction of an aromatic hydrocarbon having 8 to 12 carbon atoms. Examples of the aromatic hydrocarbons having 8 to 12 carbon atoms may include styrene, p-vinyl toluene, m-vinyl toluene, o-vinyl toluene, $\beta$-methyl-styrene, indene, 3-methyl-indene, m- ethyl styrene, p-ethyl styrene, 1-vinyl naphthalene, 2-vinyl naphthalene and the like.

The alicyclic petroleum resin used in the present invention is obtained by the polymerization of a hydrocarbon mixture oil consisting principally of a fraction of an alicyclic hydrocarbon such as cyclopentadiene, or by the intranuclear hydrogenation of the abovesaid aromatic petroleum resin.

The aniline point serves as an indication for classifying the types of the petroleum resins and is, generally, divided into +130° C. to +140° C. for the aliphatic petroleum resins, +40° C. to +50° C. for the alicyclic petroleum resins and −15° C. to 30° C. for the aromatic petroleum resins.

Irrespective of type of the petroleum resin used, the petroleum resin used in the present invention should have a number average molecular weight within a range of from 400 to 2500 and a second order transition temperature in the range of 35° to 90° C.

The petroleum resin used in the present invention usually has a (ball and ring) softening point of 65° to 160° C.

Examples of polymerization catalysts for preparing petroleum resins are cationic polymerization catalysts, anionic polymerization catalysts and radical polymerization catalysts. Concrete examples of the cationic polymerization catalysts are acidic catalysts such as $H_2SO_4$, HCl and $H_3PO_4$; halogenated metals such as $AlCl_3$, $AlBr_3$, $BF_3$, $SnCl_4$ and $TiCl_4$; as well as $BF_3$-etherate-$Al(C_2H_5)_3$, and $C_2H_5$-$AlCl_2$. Examples of the anionic polymerization catalysts are alkali metals such as sodium, and metal alkyls such as butyl lithium. Concrete examples of the radical polymerization catalysts are benzoyl peroxides, azobisisobutylonitrile and the like. Any one of these catalysts may be used for the present invention.

The acetal resin which is a major component of the composition of the present invention is by itself a known resin which is usually prepared from a formaldehyde monomer or a cyclic oligomer such as a trimer (trioxane) or a tetramer (tetraoxane). Examples of the acetal resins are oxymethylene homopolymer (often called a polyoxymethylene or a polyformaldehyde) and copolymers of formaldehyde or a cyclic oligomer thereof, and a cyclic ether represented by the hereafter-mentioned general formula (1). For example:

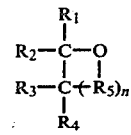    (1)

wherein $R_1$, $R_2$, $R_3$ and $R_4$ may be the same or different and each represents a hydrogen atom or an alkyl group, $R_5$ is a methylene group or an oxymethylene group, or a methylene group or an oxymethylene group which are substituted with an alkyl group (when $R_5$ has the abovementioned meaning, n takes an integer of 0 to 3), or $R_5$ is $-(CH_2)_mOCH_2-$ or $-(O-CH_2-CH_2)_mOCH_2-$ (when $R_5$ has the abovementioned meaning, n is an integer of 1 and m is an integer of 1 to 3). The aforesaid alkyl group contains 1 to 5 carbon atoms and may be substituted, depending upon the cases, with 1 to 3 halogen atoms, especially with 1 to 3 chlorine atoms.

Preferred examples of the aforementioned cyclic ethers may be formals or ethylene oxide, propylene oxide, epichlorohydrin, 1,3-dioxolane and 1,3-dioxepane, and a formal of diglycol. Preferred examples of the formal of glycol may be a cyclic formal of long-chain α,ω-diol, such as butanediol formal and hexanediol formal.

Examples of the catalysts used for the preparation of oxymethylene homopolymers are quaternary ammonium salt, quaternary phosphonium salt and tertiary sulphonium salt which are disclosed, for example, in Japanese Patent Publication No. 4287/59, and examples of the catalysts used for the preparation of oxymethylene copolymers are boron fluoride coordination complexes disclosed, for example, in Japanese Patent Publication No. 3542/60.

The acetal resins used in the present invention can be thermally stabilized by a customary manner, for example, by a method which in the case of an oxymethylene homopolymer, acylates the terminal hydroxyl groups with a carboxylic acid anhydride (e.g., a method disclosed in Japanese Patent Publication No. 6099/58).

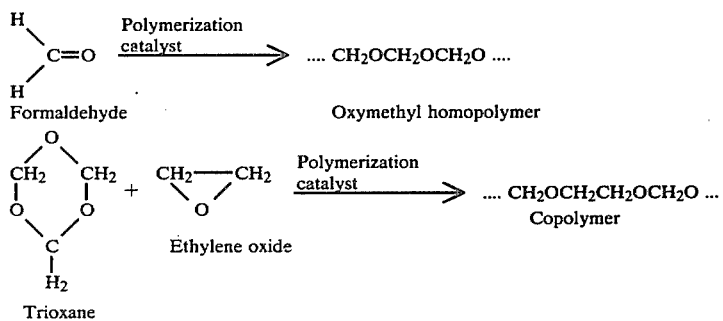

The oxymethylene copolymers will contain an oxyalkylene unit having two or more carbon atoms in an amount of less than 40 mol %, preferably in an amount of less than 10 mol % in a chain. The cyclic ethers corresponding to the oxyalkylene unit having two or more carbon atoms can be represented, for example, by the general formula (1)

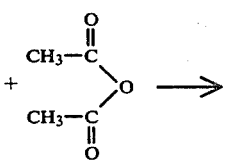

-continued

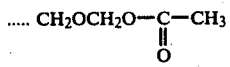

The oxymethylene copolymer can, on the other hand, be stabilized by heating and melting the copolymer or the copolymer composition to split off the volatile components (e.g., a method disclosed in Japanese Patent Publication No. 8071/64), or stabilized by way of hydrolysis (e.g., methods disclosed in Japanese Patent Publication Nos. 10435/65, 29/66 and 1875/68). All of these methods can be employed for the present invention.

Further, the composition of the present invention may be admixed with heat stabilizers and anti-oxidizing agents. Suitable combinations of addition may consist of steric hindered phenols and polyamide and/or polyvinyl pyrrolidone and/or guanidines. Other organic and inorganic fillers as well as conventional additives may also be added so far as they do not impair the effects of the present invention.

A variety of methods can be employed for preparing the acetal resin compositions of the present invention. Here, it is essential to mix or melt and knead each of the components together.

Examples of apparatus used for melting and kneading are various types of extruders, kneaders, Banbury mixers and mixing rolls which are generally used. Examples of kneading methods may include a method by which a mixture dry-blended by means of a V-shaped blender or a high-speed flow mixer such as Henschel mixer or a mixture, which is obtained by mixing the component in the form of a solution, emulsion or suspension and by drying, is introduced to the aforementioned various kneaders; a method by which the petroleum resin of the present invention is added to the homogeneous and molten acetal resin composition in the aforementioned various kneaders; or a method by which the pelletized acetal resin and the petroleum resin are dry-blended to form a mixture, and the mixture is directly fed to a molding machine such as injection-molding machine, compression-molding machine, rotary molding machine, etc., to obtain molded products.

The temperature for melting and kneading the mixture will be suitably determined depending upon various conditions such as the acetal resins used and the functions of the kneading machine. The temperature should generally range from the melting point of the acetal resin up to the decomposition temperature, and should preferably range from 175° to 230° C.

When the acetal resin composition of the present invention is melted and kneaded, it turns to be a homogeneous composition wherein the petroleum resin has been uniformly dispersed in the matrix of the acetal resin.

The invention is illustrated below concretely with reference to Examples and Comparative Examples. The inherent viscosity of the acetal resin in all the Examples was measured at 60° C. using a solution of p-chlorophenol containing 2% by weight of α-pinene, in which is dissolved the acetal resin in an amount of 0.2% by weight. The molecular weight of the petroleum resin means a number average molecular weight measured by a vapor pressure-osmometer (Hitachi-Perkin-Elmer-115, Hitachi Ltd.) and the second order transition temperature is measured by a Differential Scanning Calorimeter (Perkin-Elmer DSC-1B, Hitachi Ltd.). Also, parts are all by weight unless otherwise stated.

EXAMPLE 1 AND COMPARATIVE EXAMPLE 1:

100 Parts of a trioxane/ethylene oxide copolymer containing about 2.5% by weight of a comonomer derived from an ethylene oxide and having an inherent viscosity of 1.4 dl/g was admixed with 0.2 part of a polyvinyl pyrrolidone (molecular weight of 5400), 0.5 part of a hexamethylene-glycol-di-t-butyl-4-hydroxy hydrocinnamate and 0.1 part of $Ca(OH)_2$ as thermal-oxidation stabilizers. The mixture was thermally stabilized by means of a biaxial extruder with a vent having an L/D ratio of 11.5 and a diameter of 130 mm thereby to obtain pellets of a stable oxymethylene copolymer composition.

To a powder (5 to 200 mesh) obtained by pulverizing the pellets of the above oxymethylene copolymer composition was added 0.1 part of an alicyclic petroleum resin having a molecular weight of 750, a second order transition temperature of 60° C. and a (ball and ring-)softening point of 115° C. (tradename Arcon P115, a product of Arakawa Kagaku Kogyo Co.), and the mixture was dryblended using a V-shaped blender. The resulting mixture was extruded using a biaxial extruder with a vent having an L/D ratio of 27 and a diameter of 32 mm, and pelletized. When the pellets thus obtained were observed by means of an optical microscope, it was found out that the pellets were those of the homogeneous composition wherein the added petroleum resin was uniformly dispersed in the matrix of the acetal resin. As a comparison (Comparative Example 1), the pellets were separately obtained by quite the same process as above but without adding 0.1 part of the alicyclic petroleum resin.

Using the thus prepared two specimens, disks of a thickness of 3.2 mm and a diameter of 100 mm for measuring the mold shrinkage and deformation (degree of surface warping) were prepared using Meiki SJ-35B(manufactured by Meiki Mfg. Co.), an in-line type injection molder, under the conditions of a material temperature of 200° C., injection pressure of 750 kg/cm², screw speed of 60 rpm, metal mold temperature of 35° C., and metal mold cooling times of 40 seconds, 20 seconds and 5 seconds, and further, test pieces for testing the physical properties were also prepared under the same conditions except the metal mold temperature of 90° C. and the metal mold cooling time of 30 seconds.

The test results of the Example 1 are shown in Table 1 and Table 2 below in comparison with the results of Comparative Example 1.

Table 1

| Example No. | Deformation (mm) (surface warping) Cooling time (sec) | | | Mold shrinkage (%) | | | | | |
|---|---|---|---|---|---|---|---|---|---|
| | | | | Flowing direction Cooling time (sec) | | | Transverse direction Cooling time (sec) | | |
| | 40$^{sec}$ | 20$^{sec}$ | 5$^{sec}$ | 40$^{sec}$ | 20$^{sec}$ | 5$^{sec}$ | 40$^{sec}$ | 20$^{sec}$ | 5$^{sec}$ |
| Example 1 | 0.30 ±0.14 | 0.33 ±0.14 | 0.36 ±0.16 | 1.90 ±0.07 | 2.00 ±0.10 | 2.10 ±0.11 | 2.30 ±0.05 | 2.40 ±0.10 | 2.52 ±0.11 |
| Comparative | 1.20 | 1.50 | 1.83 | 2.30 | 2.40 | 2.50 | 2.77 | 2.90 | 2.95 |

Table 1-continued

| | Deformation (mm) | | | Mold shrinkage (%) | | | | | |
|---|---|---|---|---|---|---|---|---|---|
| | (surface warping) Cooling time (sec) | | | Flowing direction Cooling time (sec) | | | Transverse direction Cooling time (sec) | | |
| Example No. | $40^{sec}$ | $20^{sec}$ | $5^{sec}$ | $40^{sec}$ | $20^{sec}$ | $5^{sec}$ | $40^{sec}$ | $20^{sec}$ | $5^{sec}$ |
| Example 1 | ±0.20 | ±0.25 | ±0.30 | ±0.11 | ±0.10 | ±0.15 | ±0.15 | ±0.17 | ±0.20 |

Note 1:
The measurement was obtained using a dial gauge or a micrometer.
Note 2:
Measured values are within a confidence limit of 95%.

Table 2

| | Properties of injection molded articles | | | | | | | Thermal stability Weight loss at 222° C. (wt %) | |
|---|---|---|---|---|---|---|---|---|---|
| Example No. | $\sigma_T$ | $\sigma_F$ | $Y_F$ | $I_Z$ | TIS | Taber abrasion | HDT | Q | After 3 hr. | After 5 hr. |
| Example 1 | 605 | 850 | 27000 | 5.5 | 80 | 35 | 120 | $6.9 \times 10^{-4}$ | 1.7 | 3.5 |
| Comparative Example 1 | 595 | 840 | 25900 | 5.4 | 80 | 39 | 120 | $6.5 \times 10^{-4}$ | 1.7 | 3.5 |

Note:
$\sigma_T$ - tensile strength (kg/cm$^2$)
$\sigma_F$ - flexural strength (kg/cm$^2$)
$Y_F$ - flexural modulus (kg/cm$^2$)
$I_Z$ - Izod impact strength of a thickness of ⅛ inch with a notch (kg-cm/cm$^2$)
TIS - tensile impact strength (kg-cm/cm$^2$)
Taber abrasion-CS-17 wheel turned 1000 cycles (mg)
HDT-heat deformation temperature (°C.) under the load of 18.6 kg/cm$^2$
Q - flow value (190° C., 4 kg/cm$^2$) (cc/sec) using a Koka type flow tester (manufactured by Shimadzu Seisakusho Co.)
Thermal stability - thermogravimetric reduction in a test tube at 222° C.

EXAMPLE 2 AND COMPARATIVE EXAMPLE 2

The same stable trioxane/ethylene oxide copolymer composition as used in Example 1 was admixed in the pelletized form with 0.5 part of the same alicyclic petroleum resin (Arcon P115) as used in Example 1 using the Henschel mixer. The resulting mixture was directly supplied to an in-line screw-type molding machine DM-40 (manufactured by Meiki Mfg. Co.) under the conditions of a material temperature of 200° C., injection pressure of 750 kg/cm$^2$, screw speed of 600 rpm, metal mold temperature of 35° C., and the metal mold cooling time of 40 seconds, thereby to prepare the same disks as those of Example 1. Test pieces for testing the physical properties were also prepared under the same conditions with the exception of setting the metal mold temperature at 90° C. and the metal mold cooling time at 30 seconds.

As Comparative Example 2, the molded articles of the same composition were also prepared under the same conditions but without adding the alicyclic petroleum.

The test results were as shown in Table 3 below.

hydrocinnamate and 0.1 part of Ca(OH)$_2$ as thermal-oxidation stabilizers and with 0.5 part of the same alicyclic petroleum resin (Arcon P 115) as used in Example 1. The mixture was thermally stabilized by means of a biaxial extruder with a vent having an L/D ratio of 11.5 and a diameter of 130 mm thereby to obtain pellets of a stable oxymethylene copolymer composition. When the resulting pellets were observed by means of an optical microscope, it was found out that the pellets were those of the homogeneous composition wherein the added petroleum resin was uniformly dispersed in the matrix of the acetal resin.

Molded articles were obtained from the pellets by the same procedure as that of Example 1, with the exception of setting the metal mold cooling time at 30 seconds.

The test results were as shown in Table 4.

EXAMPLES 4 TO 8

The molded articles were obtained by the same procedure as that of Example 1, with the exception of setting the metal mold cooling time at 30 seconds and adding various petroleum resins.

Table 3

| | Deformation (mm) | Mold shrinkage (%) | | Properties of injection molded articles | | | | Weight loss after 5hr. at 222° C. (wt %) |
|---|---|---|---|---|---|---|---|---|
| Example No. | | Flowing direction | Transverse direction | $\sigma_F$ | $Y_F$ | TIS | Q | |
| Example 2 | 0.28 ±0.15 | 1.85 ±0.09 | 2.25 ±0.06 | 860 | 27500 | 75 | $7.4 \times 10^{-4}$ | 3.8 |
| Comparative Example 2 | 1.20 ±0.23 | 2.27 ±0.13 | 2.75 ±0.16 | 840 | 26000 | 80 | $6.5 \times 10^{-4}$ | 3.5 |

EXAMPLE 3

100 Parts of a trioxane/ethylene oxide copolymer containing about 2.5% by weight of a comonomer derived from an ethylene oxide and having an inherent viscosity of 1.4 dl/g was admixed with 0.2 part of a polyvinyl pyrrolidone (molecular weight of 5400), 0.5 part of a hexamethyleneglycol-di-t-butyl-4-hydroxy When the pellets containing the petroleum resin which were used for preparation of the molded articles were observed by means of an optical microscope, it was found out that the pellets in these examples were all those of the homogeneous composition wherein the added petroleum resin was uniformly dispersed in the matrix of the acetal resin. The test results were as shown in Table 4.

Table 4

| Example No. | Petroleum resin Type | Amount added (parts) | Deformation (mm) | Mold shrinkage (%) Flowing direction | Mold shrinkage (%) Transverse direction | Properties of injection molded articles $\sigma_F$ | $Y_F$ | TIS | Q | Weight loss after 5 hr. at 222° C. (wt %) |
|---|---|---|---|---|---|---|---|---|---|---|
| 3 | Alicyclic | 0.5 | 0.27 ±0.13 | 1.81 ±0.08 | 2.20 ±0.05 | 865 | 27700 | 70 | $7.7 \times 10^{-4}$ | 3.8 |
| 4 | Aliphatic[1] | 0.1 | 0.35 ±0.17 | 2.00 ±0.08 | 2.40 ±0.06 | 845 | 27000 | 80 | $6.9 \times 10^{-4}$ | 3.5 |
| 5 | Aromatic[2] | 0.1 | 0.35 ±0.15 | 1.90 ±0.05 | 2.30 ±0.05 | 860 | 27500 | 70 | $6.7 \times 10^{-4}$ | 3.4 |
| 6 | Alicyclic | 1.0 | 0.27 ±0.14 | 1.80 ±0.07 | 2.20 ±0.04 | 870 | 27800 | 65 | $8.3 \times 10^{-4}$ | 4.0 |
| 7 | Alicyclic | 5.0 | 0.25 ±0.13 | 1.79 ±0.07 | 2.19 ±0.05 | 900 | 28500 | 50 | $10.5 \times 10^{-4}$ | 4.5 |
| 8 | Alicyclic | 0.03 | 0.65 | 2.15 ±0.09 | 2.59 ±0.10 | 840 | 26500 | 85 | $6.6 \times 10^{-4}$ | 3.5 |

Note:
[1] Aliphatic petroleum resin used was (Hilets P-100LM) (tradename) having a number average molecular weight of 1200, a second order transition temperature of 40° C. and a (ball and ring) softening point of 100° C., a product of Mitsui Petrochemical Industries Ltd.
[2] Aromatic petroleum resin used was Petrosin 120 (tradename) having a number average molecular weight of 1200, a second order transition temperature of 70° C. and a (ball and ring) softening point of 120° C., a product of Mitsui Petrochemical Industries Ltd.

EXAMPLE 9 AND COMPARATIVE EXAMPLE 3

A trioxane/ethylene oxide copolymer containing about 2.5% by weight of a comonomer unit derived from an ethylene oxide and having an inherent viscosity of 1.2 dl/g was admixed with 0.2 part of a polyamide (melt index of 8 g/min. at 175° C.) of a dimer acid obtained by the dimerization reaction of linolic acid and an ethylene diamine, 0.5 part of a 2,2′-methylene-bis-4-methyl-6(t)-butyl phenol and 0.1 part of Ca(OH)$_2$ as thermal-oxidation stabilizers. The mixture was thermally stabilized by means of a biaxial extruder with a vent having an L/D ratio of 11.5 and a diameter of 130 mm, thereby to obtain pellets of a stable copolymer composition.

Using the thus obtained copolymer composition, the molded articles were obtained by the same procedure as that of Example 1 with the exception of setting the metal mold cooling time at 30 seconds and adding 0.1 part of the alicyclic petroleum resin that was used in Example 1, and the molded articles were also obtained quite in the same manner as above but without adding the alicyclic petroleum resin (Comparative Example 3).

The test results were as shown in Table 5.

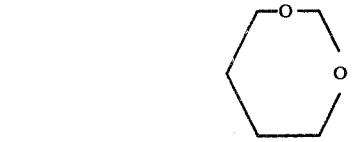

and having an inherent viscosity of 1.2 dl/g.

As Comparative Example 4, the molded articles were also obtained by the same procedure as above but without adding 0.5 part of the alicyclic petroleum resin.

The test results were as shown in Table 6 below.

EXAMPLE 11 AND COMPARATIVE EXAMPLE 5

The molded articles were obtained by the same procedure as that of Example 1 with the exception that the acetal resin used was an oxymethylene homopolymer having an inherent viscosity of 1.7 dl/g and of which terminal hydroxyl groups were acetylated with acetic anhydride and that the metal mold cooling time was 30 seconds.

As Comparative Example 5, the molded articles were

Table 5

| Example No. | Deformation (mm) | Mold shrinkage (%) Flowing direction | Mold shrinkage (%) Transverse direction | Properties of injection molded articles $\sigma_F$ | $Y_F$ | TIS | Q | Weight loss after 5 hr. at 222° C. (wt %) |
|---|---|---|---|---|---|---|---|---|
| Example 9 | 0.30 ±0.15 | 1.93 ±0.09 | 2.34 ±0.06 | 845 | 26500 | 85 | $9.9 \times 10^{-4}$ | 3.5 |
| Comparative Example 3 | 1.25 ±0.25 | 2.35 ±0.15 | 2.85 ±0.20 | 835 | 25500 | 85 | $9.5 \times 10^{-4}$ | 3.5 |

Note:
Q was measured at 220° C. under the load of 4 kg/cm$^2$.

EXAMPLE 10 AND COMPARATIVE EXAMPLE 4

Molded article were obtained by the same procedure as that of Example 3 with the exception that the acetal resin used was a trioxane-1,3-dioxepane copolymer containing about 3.5% by weight of a comonomer unit derived from a 1,3-dioxepane obtained by the same procedure as above but without adding 0.1 part of the alicyclic petroleum resin.

The test results were as shown in Table 6 below. When the pellets in Examples 9-11 were observed by means of an optical microscope, it was confirmed that the pellets were all those of the homogeneous composition wherein the added petroleum resin was uniformly dispersed in the matrix of the acetal resin.

Table 6

| Example No. | Deformation (mm) | Mold shrinkage (%) | | Properties of injection molded articles | | | | Weight loss after 5 hr. at 222° C. (wt %) |
|---|---|---|---|---|---|---|---|---|
| | | Flowing direction | Transverse direction | $\sigma_F$ | $Y_F$ | TIS | Q | |
| Example 10 | 0.31 ±0.17 | 1.85 ±0.10 | 2.25 ±0.12 | 860 | 27000 | 80 | $7.5 \times 10^{-4}$ | 3.9 |
| Example 11 | 0.55 ±0.25 | 2.15 ±0.09 | 2.60 ±0.10 | 1100 | 33500 | 105 | $1.7 \times 10^{-3*}$ | 9.6 |
| Comparative Example 4 | 1.25 ±0.29 | 2.40 ±0.15 | 2.90 ±0.20 | 835 | 26000 | 85 | $6.5 \times 10^{-4}$ | 3.7 |
| Comparative Example 5 | 1.40 ±0.31 | 2.65 ±0.25 | 3.15 ±0.31 | 1050 | 33000 | 110 | $1.5 \times 10^{-3*}$ | 9.5 |

Note:
*Q was measured at 220° C. under the load of 4 kg/cm².

COMPARATIVE EXAMPLES 6 TO 11:

Pellets were prepared using the trioxane/ethylene oxide copolymer composition by the same procedure as that of Example 3, with the exception of using various additives shown in Table 7 instead of the alicyclic petroleum resin. The test results of thermal stability are shown in Table 7 below together with the test results of Example 3.

Table 7

| Example No. | Additive | Amount added (parts) | Weight at loss at 222° C. | |
|---|---|---|---|---|
| | | | After 3hr. | After 5hr. |
| Example 3 | Alicyclic petroleum resin | 0.5 | 1.8 | 3.8 |
| Comparative Example 6 | Stearyl alcohol | 0.5 | 2.5 | 6.0 |
| Comparative Example 7 | Myristyl alcohol | 0.5 | 2.5 | 6.5 |
| Comparative Example 8 | Polyethylene glycol | 0.2 | 3.1 | 6.5 |
| Comparative Example 9 | Polyethylene glycol | 1.0 | 3.5 | 7.5 |
| Comparative Example 10 | Polyoxyethylene oxypropylene glycol | 0.5 | 3.5 | 7.0 |
| Comparative Example 11 | Stearic acid | 0.5 | 3.0 | 15.0 |

What is claimed is:

1. An acetal resin composition comprising an admixture of 100 parts by weight of an acetal resin and 0.01 to 15 parts by weight of a petroleum resin, said petroleum resin being prepared by polymerizing a cracked petroleum fraction boiling between −15° C. and 200° C. and containing unsaturated hydrocarbons, and having a molecular weight in the range of 400 to 2500 and a second order transition temperature in the range of 35° to 90° C.

2. A composition according to claim 1 wherein the petroleum resin is at least one member selected from the group consisting of an aliphatic petroleum resin, an aromatic petroleum resin, and an alicyclic petroleum resin.

3. A composition according to claim 2 wherein the aliphatic petroleum resin is obtained by polymerizing a hydrocarbon mixture oil boiling between −15° and 50° C. and principally composed of a fraction of an aliphatic hydrocarbon having 4 or 5 carbon atoms.

4. A composition according to claim 2 wherein the aromatic petroleum resin is obtained by polymerizing a hydrocarbon mixture boiling 100° C. and 200° C. and principally composed of a fraction of an aromatic hydrocarbon having 8 to 12 carbon atoms.

5. A composition according to claim 2 wherein the alicyclic petroleum resin is obtained by the polymerization of a hydrocarbon mixture oil consisting principally of a fraction of an alicyclic hydrocarbon, or by the intranuclear hydrogenation of the aromatic petroleum resin.

* * * * *